United States Patent [19]
Cheng

[11] Patent Number: 5,967,189
[45] Date of Patent: Oct. 19, 1999

[54] PROTECTIVE CAP FOR A FIBEROPTIC CABLE

[76] Inventor: Yu-Feng Cheng, No. 7, Fuhsing St., Tucheng Ind. Dist., Tucheng City, Taipei Hsien, Taiwan

[21] Appl. No.: 09/203,640

[22] Filed: Dec. 1, 1998

[51] Int. Cl.⁶ .................................................... F16L 55/10
[52] U.S. Cl. ............................ 138/89; 138/91; 350/96.2; 350/96.21
[58] Field of Search ................................ 350/96.21, 96.2; 385/100, 135, 53, 55; 254/134.3 CL; 380/4, 20; 24/257; 138/107, 89, 91; 250/227; 367/157

[56] References Cited

U.S. PATENT DOCUMENTS

| | | | |
|---|---|---|---|
| 4,280,258 | 7/1981 | Kunze | 24/257 |
| 4,411,491 | 10/1983 | Larkin et al. | 350/96.21 |
| 4,424,954 | 1/1984 | Innes | 254/134.3 CL |
| 4,645,295 | 2/1987 | Pronovost | 350/96.2 |
| 4,783,137 | 11/1988 | Kosman et al. | 385/53 |
| 4,991,928 | 2/1991 | Zimmer | 350/96.2 |
| 5,243,647 | 9/1993 | Parikh et al. | 380/4 |
| 5,243,651 | 9/1993 | Parikh et al. | 380/20 |
| 5,303,320 | 4/1994 | Duffie | 385/135 |
| 5,367,598 | 11/1994 | Devenish, III et al. | 385/135 |
| 5,381,833 | 1/1995 | Cummings et al. | 130/107 |
| 5,491,766 | 2/1996 | Huynh et al. | 385/100 |

*Primary Examiner*—Denise L. Ferensic
*Assistant Examiner*—Davis Hwu
*Attorney, Agent, or Firm*—William E. Pelton

[57] ABSTRACT

A protective cap has a hollow tubular cable clamp, a spacer integrally formed with and extending from mid-portion of the tubular cable clamp, a "T" shaped extension integrally formed on the free end of the spacer and two tubular caps respectively integrally formed on the ends of the extension. A cutout is defined in the tubular cable clamp and the side faces defining the cutout are inclined with respect to each other, such that the user is able to insert the fiber optic cable into the tubular cable clamp with ease.

5 Claims, 5 Drawing Sheets

PROTECTIVE CAP FOR A FIBEROPTIC CABLE

BACKGROUND OF THE INVENTION

1. Field of the Invention

The present invention relates to a protective cap, and in particular to an improved car to detachably connect with the ends of a fiber optic cable.

2. Description of Related Art

After the introduction of fiberoptics into the communications field, fiberoptics quickly became the most popular media for transmitting signals of all kinds. Notwithstanding the numerous advantages and widespread popularity of fiberoptics, it was realized that fiberoptic material can be quite fragile. During fabrication, transportation, assembly, installation and even storage, the ends of the fiber optic connectors and filaments may be easily damaged. Heretofore, a protective cap, as shown in FIGS. 4 and 5, was developed to prevent the ends of the cables and filaments from being damaged. This prior type of protective cap comprises a loop (70), a first retainer (71) integrally formed with and extending from the loop (70), a first cap (72) integrally formed with the other end of the first retainer (71), a second retainer (73) integrally formed, with and extending from the first cap (72) and a second cap (74) integrally formed with the other end of the second retainer (73). With such a construction and design, the loop (70) is able to securely connect with the fiberoptic cable (60) by inserting the fiber optical (60) through the loop (70) before installing the connectors (61) on the ends of the cable (60). After the loop (70) is connected with the fiber optic cable (60), the first cap (72) and the second cap (74) are then able to cover both ends of the connectors (61) that contain the fiberoptic filaments (not shown) thereby avoiding any damage to either the end of the connector (61) or the fiberoptic filament from external sources. Although, the protective cap as described above is able to protect the ends of the fiberoptic cable (60) and the fiberoptic filaments from being damaged, it still suffers from the following disadvantages, such as:

1. Appearance:

Because of the way the loop (70) is attached to the fiberoptic cable (60), the protective cap is attached to the fiberoptic cable (60) at all times, which may make it difficult to handle the fiberoptic cable (60) and also decreases its visual appeal.

2. Increased cost

Because the loop (70), the first retainer (71), the first cap (72), the second retainer (73) and the second cap (74) are formed in one piece, their manufacture and handling is difficult. It has been necessary heretofore for manufacturers to be extra careful during production and later handling, which increases the cost.

3. Irreplaceable

When either one of the first cap (72) or the second cap (74) is broken, the user will not be able to replace the broken piece. To replace the protective cap, the user must remove one of the connectors (61), insert the fiberoptic cable (60) through the loop (70) of the new protective cap and replace the connector (61), which is troublesome and time consuming.

It is therefore a principal objective of the present intention to provide a protective cap for use with a fiberoptic cable that mitigates or obviates the foregoing and other disadvantages of the conventional protective cap.

DETAILED DESCRIPTION OF PREFERRED EMBODIMENT

Figure 1:
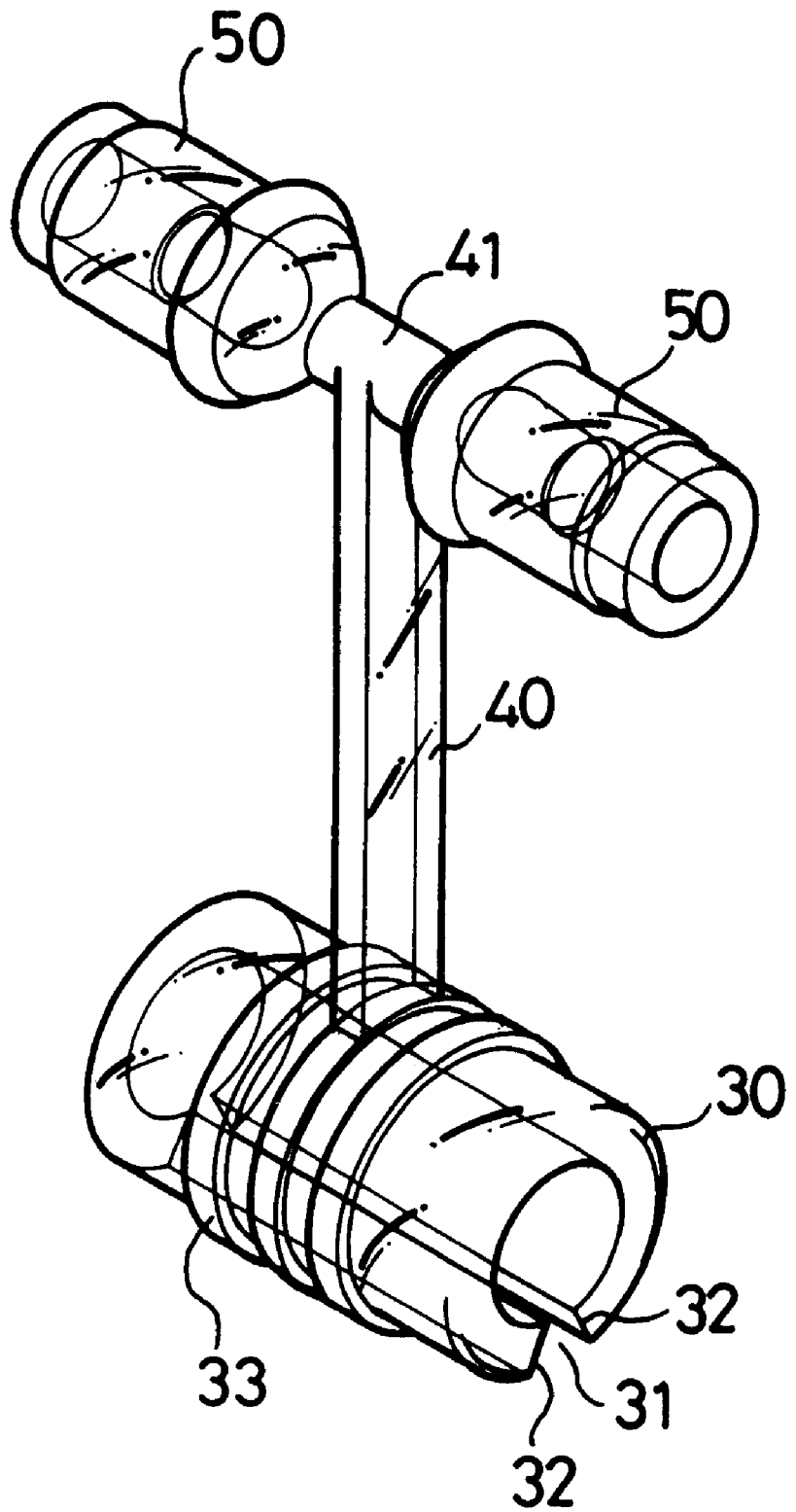
FIG. 1 is a perspective view of a protective cap in accordance with the present invention.

In FIG. 1, a protective cap for a fiberoptic cable in accordance with the present invention is shown. The protective cap comprises a hollow tubular cable clamp (30), a spacer (40) integrally formed with and extending from a mid-portion of the tubular cable clamp (30), an extension (41) integrally forming a "T" on the free end of the spacer (40) and a tubular cap (50) integrally formed on each end of the extension (41). It is to be noted that the tubular cable clamp (30) has a cutout (31) transversely defined therein and the side faces (32) defining the cutout (31) are inclined with respect to each other. With the cutout (31) and the inclined side faces (32), the fiberoptic cable (not shown) is able to be easily inserted into the hollow tubular cable clamp (30). Furthermore, an orientation of the cutout (31) is opposite to an orientation of the spacer (40), such that the spacer (40) is substantially orthogonal to a circumference of the tubular cable clamp (30).

Figure 2:
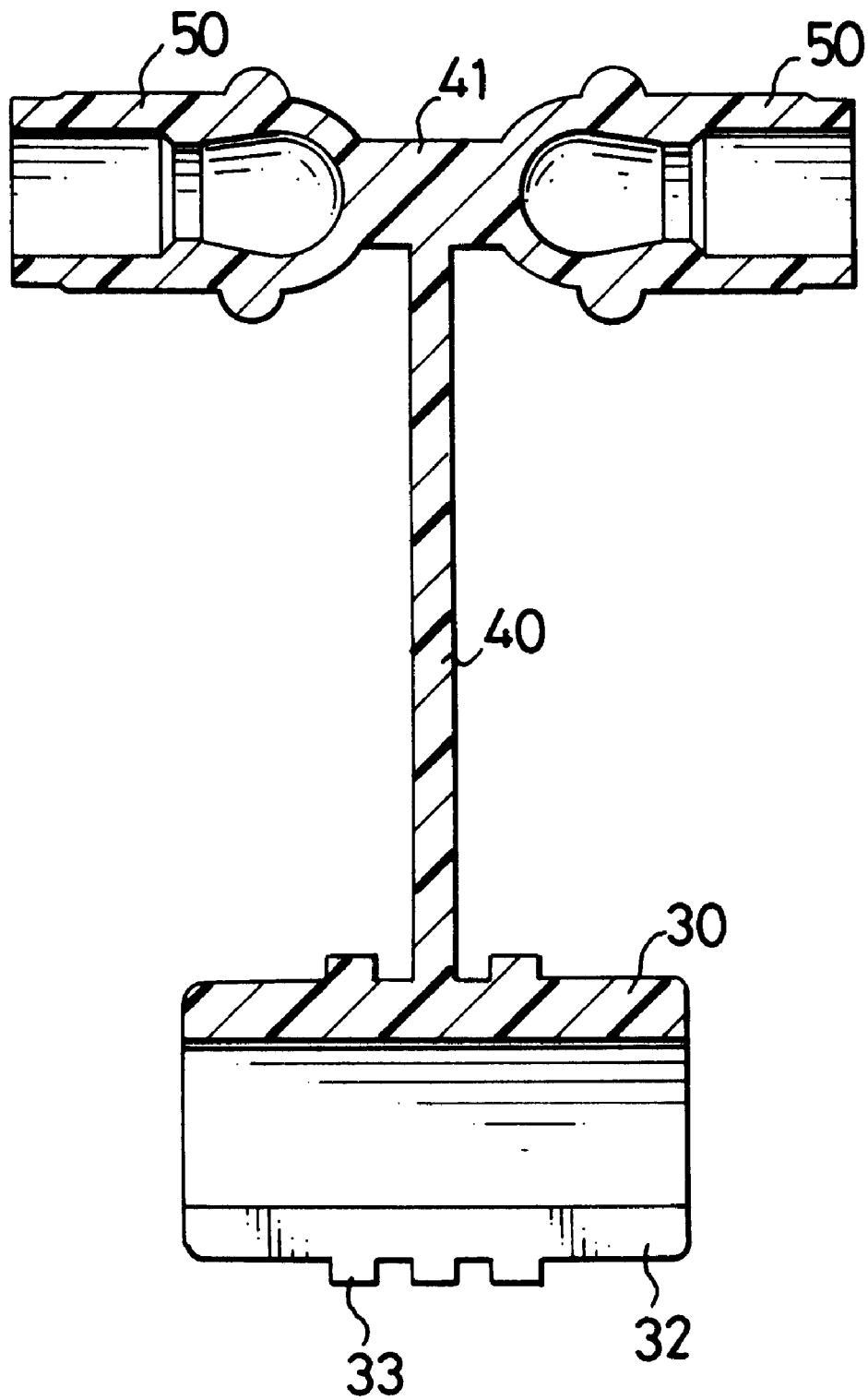
FIG. 2 is a schematic cross sectional view of the present invention.
Figure 3:
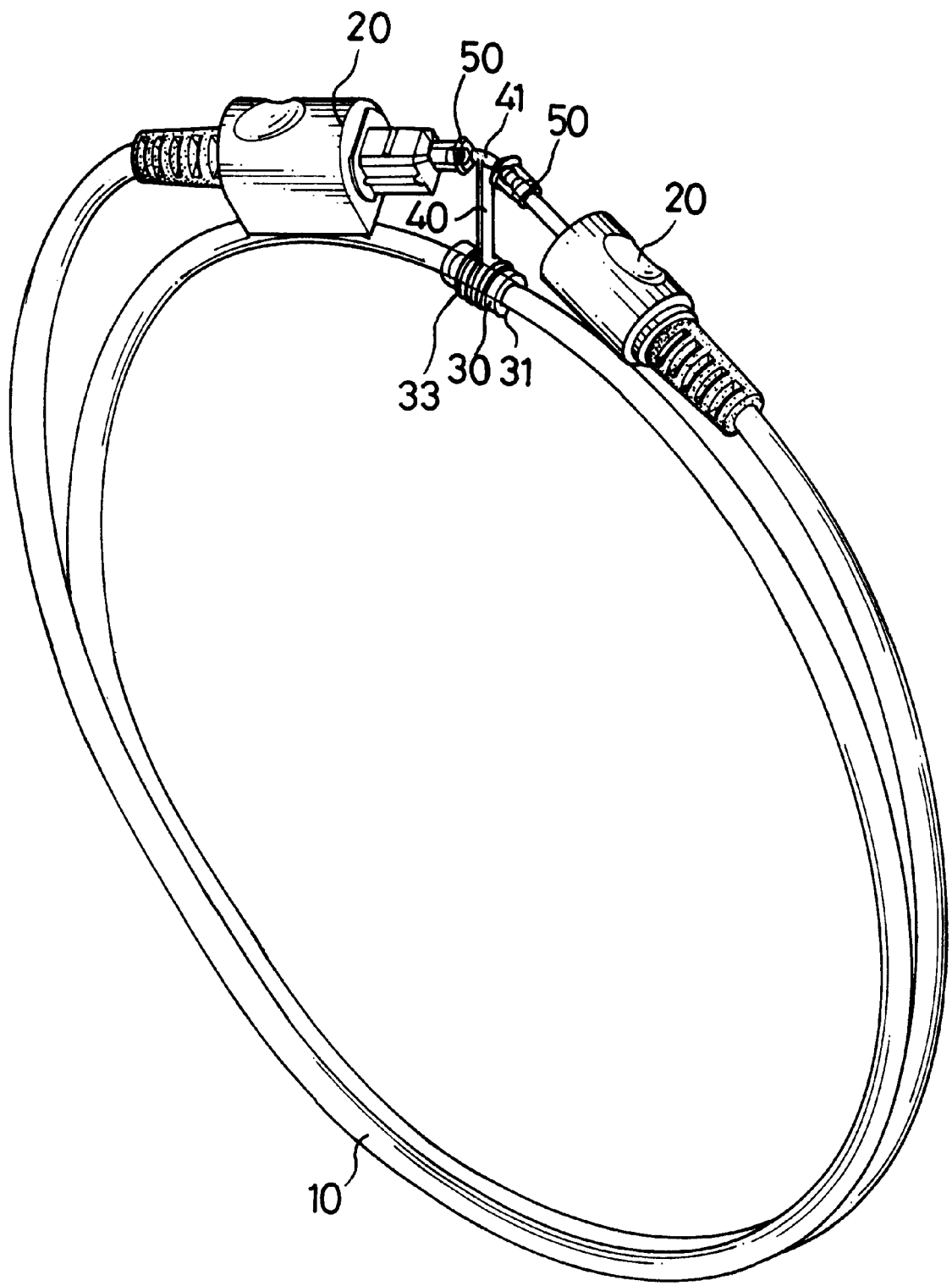
FIG. 3 is a schematic view showing the attachment of the protective cap of the invention to the fiber optical.
Figure 4:
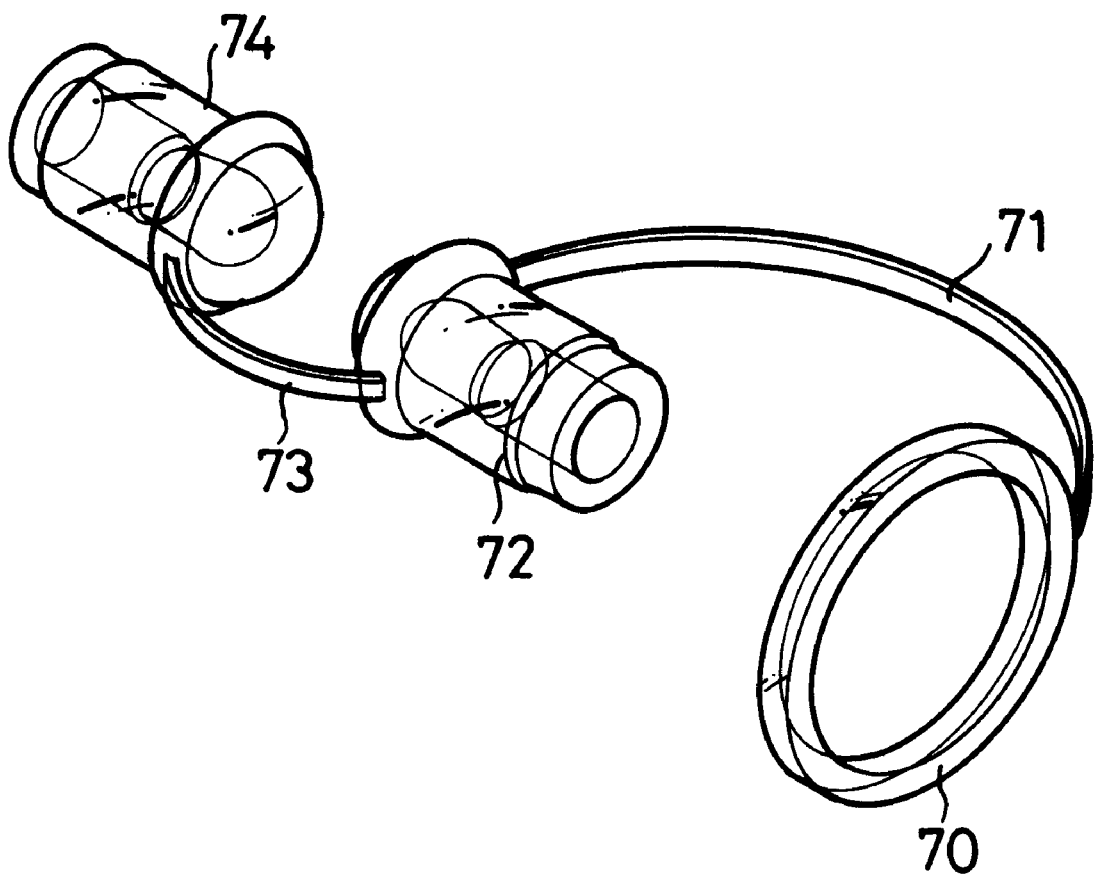
FIG. 4 is a perspective view of a conventional cap.
Figure 5:
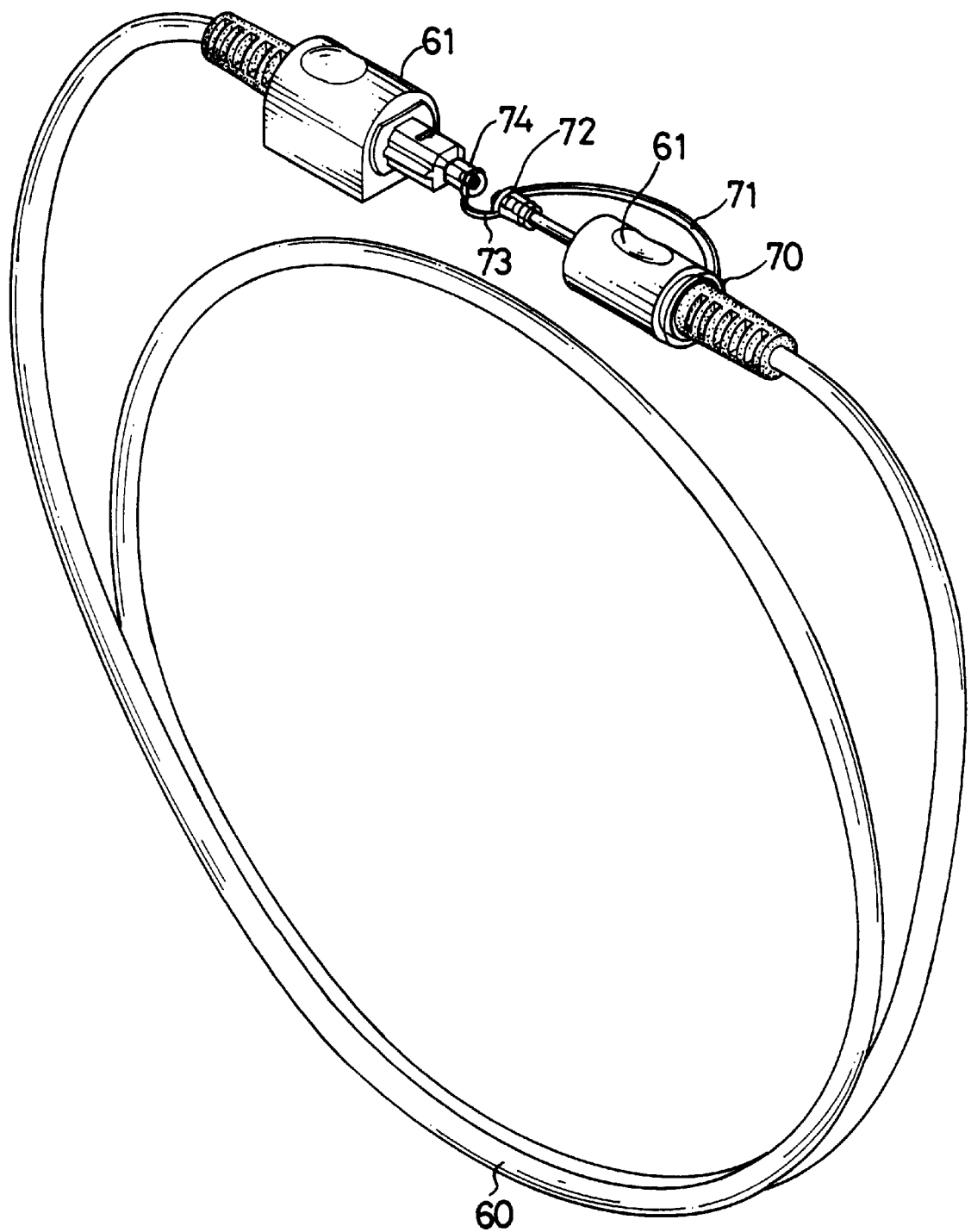
FIG. 5 is a schematic view showing the attachment of the cap shown in FIG. 4 to the fiber optical.

Referring again to FIG. 1 and FIG. 2, the tubular cable clamp (30) further has a plurality of ribs (33) formed therearound to reinforce the strength of the periphery of the tubular cable clamp (30). With reference to FIG. 3, the fiberoptic cable (10) can be inserted into the tubular cable clamp (30) through the cutout (31), and the small ends of both connectors (20) on the fiber optic cable (10) are respectively fit into one of the tubular caps (50). The spacer (40) in conjunction with the tubular cable clamp (30) on one end and the tubular caps (50) on the other end is able to keep the fiber optic cable (10) connectors (20) separated from the rest of the fiberoptic cable (10).

From the foregoing description it will be apparent that the present invention has at least the following advantages:

1. Appearance

Because the protective cap can be easily separated from the fiber optic cable (20) when the cable (20) is in use, the protective cap does not detract from the visual effect by adding unused clutter and will not hinder installation of the cable (20).

2. Replaceable

Due to the cutout (31) in the tubular cable clamp (30), and the inclined side face (32) defining the cutout (31), the protective cap of the invention is easily detachable from the fiber optic cable (10). Therefore, the user is able to easily change a damaged protective cap.

What is claimed is:

1. A protective cap for a fiber optic cable comprising:

a hollow tubular cable clamp for attachment around the fiber optic cable;

a spacer integrally formed with and extending from the tubular cable clamp;

a "T" shaped extension integrally formed with the spacer; and two tubular caps respectively integrally formed on free ends of the extension to accommodate the ends of fiber optic connectors therein.

2. The protective cap as claimed in claim 1, wherein the tubular cable clamp has a cutout transversely defined therein.

3. The protective cap as claimed in claim 2, wherein the side faces defining the cutout in the cable clamp are inclined with respect to each other.

4. The protective cap as claimed in claim 1, wherein the spacer is orthogonal to the tubular cable clamp.

5. The protective cap as claimed in claim 1, wherein a plurality of ribs are formed around the tubular cable clamp so as to reinforce the strength thereof.

* * * * *